(12) United States Patent
Koyama et al.

(10) Patent No.: US 7,199,845 B2
(45) Date of Patent: Apr. 3, 2007

(54) 2D/3D SWITCH LIQUID CRYSTAL DISPLAY PANEL AND 2D/3D SELECTION LIQUID CRYSTAL DISPLAY

(75) Inventors: Yoshihide Koyama, Yamatokoriyama (JP); Shinichi Miyazaki, Nara (JP)

(73) Assignee: Sharp Kabushiki Kaisha, Osaka (JP)

( * ) Notice: Subject to any disclaimer, the term of this patent is extended or adjusted under 35 U.S.C. 154(b) by 97 days.

(21) Appl. No.: 10/529,057

(22) PCT Filed: Jun. 26, 2003

(86) PCT No.: PCT/JP03/08160

§ 371 (c)(1),
(2), (4) Date: Mar. 24, 2005

(87) PCT Pub. No.: WO2004/029701

PCT Pub. Date: Apr. 8, 2004

(65) Prior Publication Data

US 2005/0285997 A1    Dec. 29, 2005

(30) Foreign Application Priority Data

Sep. 26, 2002  (JP) ............................ 2002-280547
Mar. 18, 2003  (JP) ............................ 2003-074073

(51) Int. Cl.
*G02F 1/1335* (2006.01)
(52) U.S. Cl. ..................................................... 349/15
(58) Field of Classification Search .................. 349/15
See application file for complete search history.

(56) References Cited

U.S. PATENT DOCUMENTS 5,875,055 A * 2/1999 Morishima et al. ......... 359/465
5,945,965 A * 8/1999 Inoguchi et al. ................ 345/6
6,046,849 A   4/2000 Mosely et al.
6,055,013 A   4/2000 Woodgate et al.

(Continued)

FOREIGN PATENT DOCUMENTS

EP    0 860 728 A1    8/1998
JP    56-172825 U    12/1981

(Continued)

OTHER PUBLICATIONS

International Search Report mailed Aug. 26, 2003 in corresponding JP PCT application No. PCT/JP03/08160.
International Preliminary Examination Report mailed Jun. 22, 2004 in corresponding PCT Application No. PCT/JP03/08160.

*Primary Examiner*—James A. Dudek
(74) *Attorney, Agent, or Firm*—Nixon & Vanderhye P.C.

(57) ABSTRACT

A 2D/3D switching type liquid crystal display device includes: (i) display liquid crystal panel (10) for generating an image in accordance with input image data; (ii) patterned retardation plate (20) for rendering a certain viewing angle to a display image during 3D display, so as to provide a 3D effect; and (iii) a switching liquid crystal panel (30) for switching 2D display and 3D display by activating and deactivating the effect of the parallax barrier means. The patterned retardation plate (20) and the switching liquid crystal panel (30) respectively have wider active areas than an active area of the display image generating means. With this, the 2D/3D switching liquid crystal display device allows for a viewing angle in 2D as wide as a viewing angle of 2D-only display.

14 Claims, 14 Drawing Sheets

U.S. PATENT DOCUMENTS

| | | | |
|---|---|---|---|
| 6,876,495 B2* | 4/2005 | Street | 359/622 |
| 2001/0001566 A1* | 5/2001 | Moseley et al. | 349/15 |
| 2001/0030715 A1* | 10/2001 | Tabata | 349/15 |
| 2002/0145682 A1* | 10/2002 | Kwon et al. | 349/15 |
| 2003/0067563 A1* | 4/2003 | Tomono et al. | 349/15 |
| 2003/0107686 A1* | 6/2003 | Sato et al. | 349/15 |
| 2006/0203339 A1* | 9/2006 | Kleinberger et al. | 359/465 |

FOREIGN PATENT DOCUMENTS

| | | |
|---|---|---|
| JP | 63 141927 U | 9/1988 |
| JP | 4-296825 A | 10/1992 |
| JP | 8-101367 A | 4/1996 |
| JP | 10-123461 A | 5/1998 |
| JP | 10-229567 A | 8/1998 |

* cited by examiner

■ LIGHT-SHIELDING AREA
□ LIGHT-TRANSMITTING AREA
▨ RIGHT-EYE IMAGE
▨ LEFT-EYE IMAGE

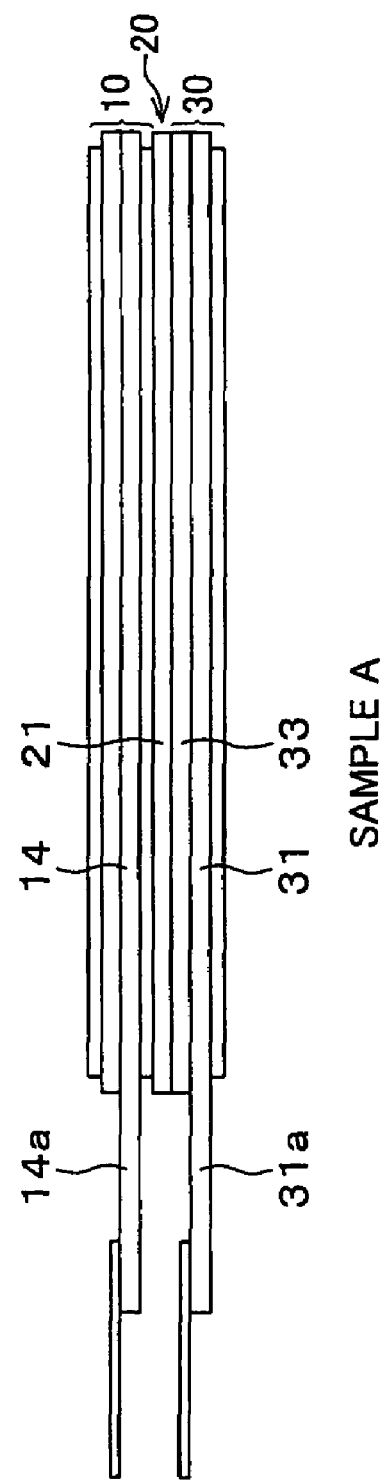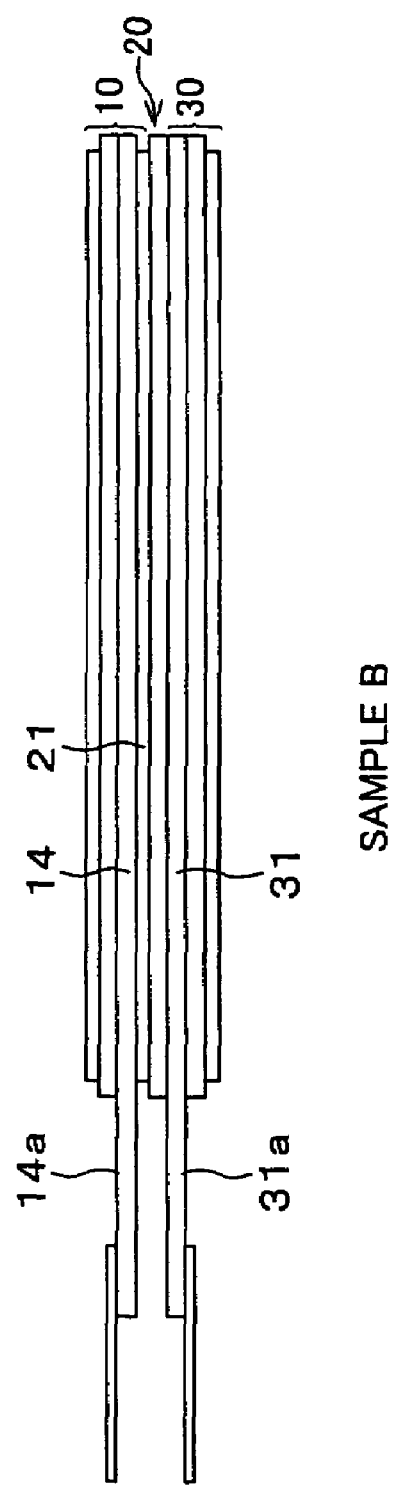
FIG. 13(a) SAMPLE A
FIG. 13(b) SAMPLE B

ASSEMBLY MODULE

2D/3D SWITCH LIQUID CRYSTAL DISPLAY PANEL AND 2D/3D SELECTION LIQUID CRYSTAL DISPLAY

This application is the US national phase of international application PCT/JP03/08160 filed on 26 Jun. 2003, which designated the US and claims priority of JP Application No. 2002-280547 filed 26 Sep. 2002 and JP Application No. 2003-074073 filed 18 Mar. 2003. The entire contents of these applications are incorporated herein by reference.

TECHNICAL FIELD

The present invention relates to a 2D/3D switching type liquid crystal display panel, and to a 2D/3D switching type liquid crystal display device, both of which allow switching of a first display (2D display) and a second display (3D display).

BACKGROUND ART

In a normal field of vision, the two eyes perceive views of the world from two different perspectives due to their spatial separation within the head. The images from these two perspectives are then recognized as a stereoscopic image by the brain due to parallax of the two images. By utilizing this principle, there has been developed a liquid crystal display in which 3D (three-dimensional) display is carried out by parallax generated by causing an observer to see images from two different points of view through the right eye and the left eye, respectively.

In some 3D liquid crystal displays, images from different points of view are supplied to the respective eyes of the observer by first encoding the left eye image and right eye image on the display screen according to e.g. color, polarization state, or display time, and then separating these images through a filter system of glasses worn by the observer. In this way, only images intended for the respective eyes are supplied to the left eye and right eye of the observer.

In other liquid crystal displays, a display panel 101 is combined with a parallax barrier 102 having a light-transmitting region and a light-shielding region arranged in a stripe pattern. This allows an observer to recognize a 3D image without using a visual assistance such as the filtering system (autostereoscopic display). Specifically, a parallax barrier 102 gives specific viewing angles to the right eye image and left eye image generated by the display panel 101 (see FIG. 11(a)). When viewed in a specific spatial viewing range, only images intended for the respective eyes are viewed by the observer, and a 3D image is recognized (see FIG. 11(b)).

Such a liquid crystal display device that carries out autostereoscopic display by using the parallax barrier is disclosed in U.S. Pat. No. 6,055,013 (Date of Patent: Apr. 25, 2000), for example. In U.S. Pat. No. 6,055,013 (Date of Patent: Apr. 25, 2000), a patterned retardation plate is used as the parallax barrier.

Such a liquid crystal display device employing a parallax barrier is also disclosed in U.S. Pat. No. 6,046,849 (Date of Patent: Apr. 4, 2000), for example. In the liquid crystal display disclosed in this publication, 3D display and 2D display (two-dimensional display) are electrically switched by providing a switching liquid crystal layer or the like as a means of activating and inactivating the effect of the parallax barrier. That is, in accordance with ON/OFF of the switching liquid crystal layer, the display of U.S. Pat. No. 6,046,849 (Date of Patent: Apr. 4, 2000) performs 3D display when the effect of the parallax barrier is activated, and performs 2D display when the effect of the parallax barrier is inactivated.

However, the following problems arise in the conventional 2D/3D switching liquid crystal display devices.

Such a 2D/3D switching type liquid crystal display device carries out the 3D display by allowing emitted light, from a light source, to pass through three active areas: the switching liquid crystal layer, the parallax barrier, and a display liquid crystal layer (liquid crystal layer on which a display image is generated). Therefore, the 2D/3D switching type liquid crystal display device is realized by a transmissive type liquid crystal display device.

Meanwhile, while the 2D/3D switching type liquid crystal display device carries out the 2D display with the parallax barrier deactivated by the switching liquid crystal layer, emitted light from the light source also passes through the three active areas (the switching liquid crystal layer, the parallax barrier, and the display liquid crystal layer) in the same manner as during the 3D display.

Because the 2D/3D switching type liquid crystal display device carrying out the 2D display includes the switching liquid crystal layer and the parallax barrier, the 2D/3D switching type liquid crystal display device have a thicker liquid crystal display panel than a device carrying out only 2D display (hereinafter, 2D display by such a device is referred to as "2D-only display"). Therefore, even when the observer obliquely views the display screen of the 2D/3D switching type liquid crystal display device from a point within the viewing angle secured by the display liquid crystal layer, the other components (i.e., the switching liquid crystal panel and the parallax barrier) possibly prevent recognition of an image displayed on a peripheral portion of a display area of the display liquid crystal layer. In other words, this narrows the viewing angle, which ensures recognition of the entire display area of the display liquid crystal layer, as compared with the viewing angle of the 2D-only display.

Further, in the 2D/3D display liquid crystal display device having such a structure, a display liquid crystal panel requires, outside of its active area, a region for a terminal section for input and output of electric signals (a scan signal and a data signal). Moreover, a switching liquid crystal panel is required to receive a signal (switching signal) for electrically switching optical properties of the switching liquid crystal layer. Therefore, a terminal section for receiving the switching signal is also required to be provided outside the active area of the switching liquid crystal panel.

On the other hand, because the patterned retardation plate serving as the parallax barrier is not required to receive such electric signals, a substrate of the patterned retardation plate does not essentially require any area other than its active area.

Accordingly, because substrates of the display liquid crystal-panel and the switching liquid crystal panel are provided with the terminal sections, the substrates are larger than the patterned retardation plate by sizes of the terminal formation portions, respectively. Therefore, the terminal formation portions of the display liquid crystal panel and the switching liquid crystal panel protrude from a 2D/3D switching type liquid crystal display panel constructed by assembling the display liquid crystal panel, the patterned retardation plate, and the switching liquid crystal panel.

Because the terminal formation portions thus protrude from the 2D/3D switching type liquid crystal display panel, and are portions of the substrates made of glass, the terminal formation portions tend to be easily broken by external stress. For example, the glass substrates are cracked by the external stress, such as dropping and impact, exerted on the terminal formation portions. This causes the liquid crystal display panel to, e.g., be out of display action. Such a problem is particularly serious for liquid crystal display panels for a mobile phone and a PDA (Personal Digital Assistants).

The present invention is made to solve the problems, and its object is to provide a 2D/3D switching type liquid crystal display panel and a 2D/3D switching type liquid crystal display device, each of which allows the viewing angle during the 2D display to be as wide as that in the 2D-only display. Another object of the present invention is to improve reliability against the dropping and the impact.

DISCLOSURE OF INVENTION

To achieve the objects, a 2D/3D switching type liquid crystal display panel, of the present invention, capable of 2D display and 3D display includes: display image generating means for generating an image in accordance with input image data; parallax barrier means for rendering a certain viewing angle to a display image during 3D display, so as to provide a 3D effect; and switching means for switching 2D display and 3D display by activating and deactivating the effect of the parallax barrier means, the parallax barrier means and the switching means respectively having wider active areas than an active area of the display image generating means.

During 2D display and 3D display by the 2D/3D switching type liquid crystal display panel, the image display is carried out by allowing emitted light, from a light source, to pass through the three active areas of the display image generating means, the parallax barrier means, and the switching means.

In cases where the active areas have the same width, the constituent members of the parallax barrier means and the switching means possibly interrupt an image in the peripheral portion of the display area (the active area of the display image generating means) when the observer views a display screen obliquely during the 2D display.

With the arrangement, the active areas of the parallax barrier means and the switching means are wider than the active area of the display image generating means. In this case, it is possible to restrain such a problem that other areas outside the active areas of the parallax barrier means and the switching means shield off the light having passed through a vicinity of an end portion of the display screen and through the active area of the display image generating means. This improves the viewing angle during 2D display.

The 2D/3D switching type liquid crystal display panel is preferably arranged such that one of the active areas of the parallax barrier means and the switching means farther away from the active area of the display image generating means has a wider area. The 2D/3D switching type liquid crystal.

The 2D/3D switching type liquid crystal display panel is preferably arranged such that $d1 \geq t1 \cdot \tan \theta 1$, and $d2 \geq t2 \cdot \tan \theta 1$ are satisfied, where d1 is a widthwise protruding amount from an end portion of the active area of the display image generating means to an end portion of the active area of the parallax barrier means and, d2 is a widthwise protrusion amount from the end portion of the active area of the display image generating means to an end portion of the active area of the switching means, t1 is a distance, in a panel thickness direction, between the active area of the parallax barrier means and the active area of the display image generating means, and t2 is a distance, in the panel thickness direction, between the active area of the switching means and the active area of the display image generating means, and θ1 is a viewing angle secured by the display image generating means the 2D/3D switching type liquid crystal With the arrangement, emitted light at the viewing angle θ1 passes through (i) the end portion of the active area of the display image generating means, and (ii) the active areas of the parallax barrier means and the switching means. This secures the display image from missing at the end portion even when viewed at a viewing angle as wide as that of the 2D-only display.

The 2D/3D switching type liquid crystal display panel is preferably arranged such that: the parallax barrier means is constituted of (i) a patterned retardation plate in which two optical regions with different retardation axis directions are patterned alternately in a stripe manner, and (ii) a parallax barrier polarizer whose transmission axis is fixed in one direction, and the display image generating means, the patterned retardation plate, and the switching means are disposed in this order.

The arrangement shortens the distance between the display image generating means and the patterned retardation plate. This makes it easier to obtain the 3D display effect during 3D display.

The 2D/3D switching type liquid crystal display panel is preferably arranged such that: the parallax barrier means is constituted of (i) a patterned retardation plate in which two optical regions with different retardation axis directions are patterned alternately in a stripe manner, and (ii) a parallax barrier polarizer whose transmission axis is fixed in one direction, the switching means is constituted of a liquid crystal panel for switching, between ON and OFF of an applied voltage, an optical modulation effect on light passing through the switching means, and in 2D display, the light passing the switching means is affected by two optical areas of the patterned retardation plate to pass through the parallax barrier polarizer at the same transmittance, and in 3D display, the light passing the switching means is affected by the optical areas of the patterned retardation plate to pass through the parallax barrier polarizer at the different transmittances.

With the arrangement, the light having passing through the switching means enters the patterned retardation plate of the parallax barrier, and then enters the parallax barrier polarizer. The light beams entering the patterned retardation plate are subjected to different optical modulations in the respective optical areas of the patterned retardation plate, and become light beams having different polarization states. During 2D display, the parallax barrier polarizer renders the same transmittance to the light having passed through the optical areas. This deactivates the effect of the parallax barrier means. In contrast, during the 3D display, the parallax barrier polarizer renders different transmittances to the light beams; i.e., to (i) the light having passed through one optical area serving as a transmitting area and to (ii) the light having passed through the other optical area serving as a shielding area, respectively. This activates the effect of the parallax barrier means.

On this account, it is possible to switch 2D display and 3D display by switching ON and OFF voltage application to the switching means.

The 2D/3D switching type liquid crystal display panel may be arranged so that: the display image generating means is provided as a display liquid crystal panel that has two substrates between which a display liquid crystal layer is sandwiched, and that is able to generate a display image for each of 2D display and 3D display, the parallax barrier means is provided as a patterned retardation plate that is obtained by providing, on a substrate, a patterned liquid crystal layer aligned in a specific pattern, and that renders a certain viewing angle to an image for 3D display, the switching means is provided as a switching liquid crystal panel that has two substrates between which a switching liquid crystal layer is sandwiched, and that switches between 2D display and 3D display by activating and deactivating the effect of the parallax barrier of the patterned retardation plate, and the display liquid crystal panel and the switching liquid crystal panel are provided such that a terminal formation portion of the display liquid crystal panel and a terminal formation portion of the switching liquid crystal panel are on a same side of the 2D/3D switching type liquid crystal display panel.

With the arrangement, the terminal formation portions of the display liquid crystal panel and the switching liquid crystal panel overlap with each other when viewed from the display screen. This improves strength against a stress exerted on the display screen, and makes it difficult to generate a crack in the substrate having the terminal formation portions.

The 2D/3D switching type liquid crystal display panel may be arranged such that: the display image generating means is provided as a display liquid crystal panel that has two substrates between which a display liquid crystal layer is sandwiched, and that is able to generate a display image for each of 2D display and 3D display; the parallax barrier means and the switching means are provided as a switching liquid crystal panel, the switching liquid crystal panel having two substrates between which a switching liquid crystal layer is sandwiched, and a specific pattern; and the display liquid crystal panel and the switching liquid crystal panel are disposed such that a terminal formation portion of the display liquid crystal panel and a terminal formation portion of the switching liquid crystal panel are on a same side of the 2D/3D switching type liquid crystal display panel.

With the arrangement, the terminal formation portions of the display liquid crystal panel and the switching liquid crystal panel overlap with each other when viewing from the display screen. This improves strength against a stress exerted on the display screen, and makes it difficult to generate a crack in the substrate having the terminal formation portions.

The 2D/3D switching type liquid crystal display panel may be arranged such that: the terminal formation portion of the display liquid crystal panel is provided on one of two substrates of the display liquid crystal panel, and the terminal formation portion of the switching liquid crystal panel is provided on one of two substrates of the switching liquid crystal panel, and the display liquid crystal panel and the switching liquid crystal panel are disposed face to face so that the substrates respectively having the terminal formation portions face each other.

The arrangement shorten distance between the substrate having the terminal formation portion of the display liquid crystal panel and the substrate having the terminal formation portion of the switching liquid crystal panel. On this account, when an external force is exerted on the terminal formation portions, the substrates make contact with each other, thereby improving strength of the substrate. This makes it difficult to generate a crack in the substrates having the terminal formation portion.

Additional objects, features, and strengths of the present invention will be made clear by the description below.

Further, the advantages of the present invention will be evident from the following explanation in reference to the drawings.

BRIEF DESCRIPTION OF DRAWINGS

FIG. 13(a) is a cross section view illustrating a structure of sample A of the 2D/3D switching type liquid crystal display panel used for a drop test.

FIG. 13(b) is a cross section view illustrating a structure of sample B of the 2D/3D switching type liquid crystal display panel used for a drop test.

BEST MODE FOR CARRYING OUT THE INVENTION

Hereinafter, detail of the present invention is further described in accordance with examples and comparative examples; however, the present invention is not limited to these.

The following description deals with an embodiment of the present invention with reference to FIG. 1 through FIG.

Figure 12:
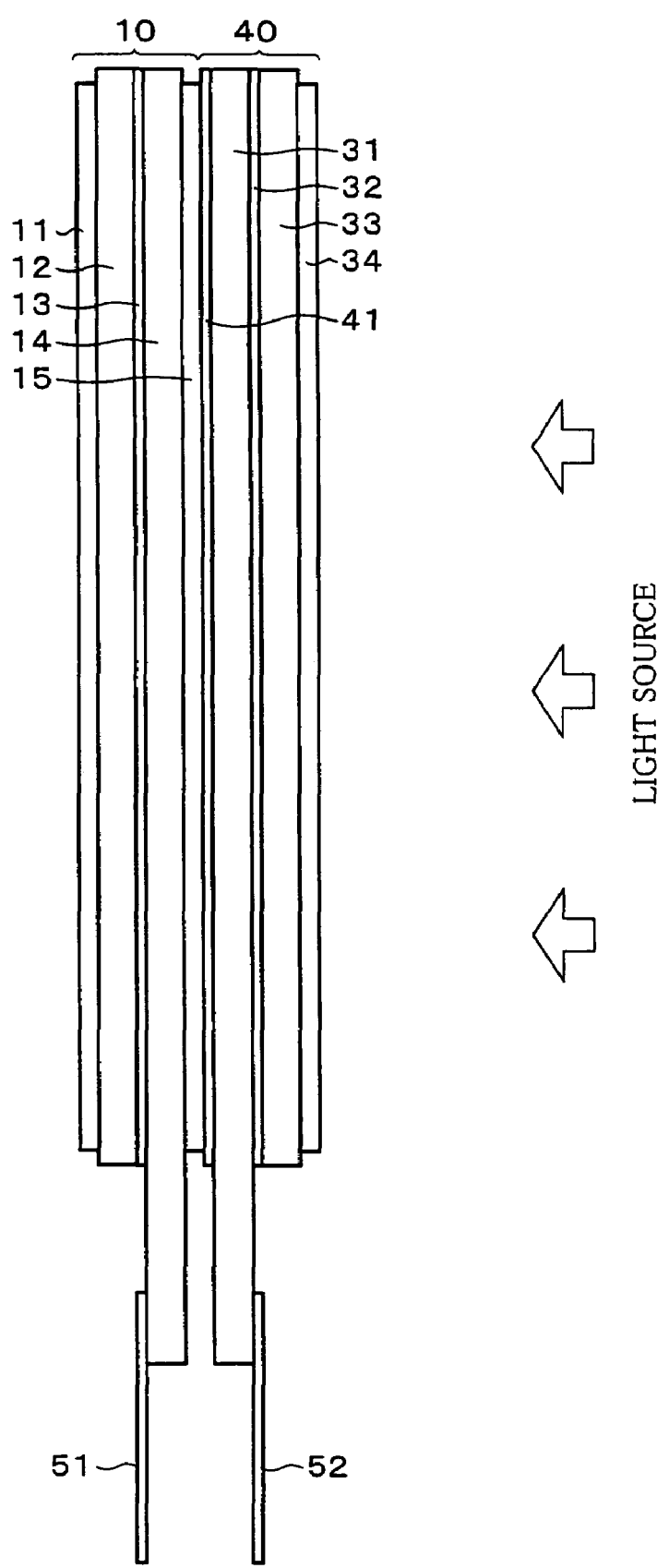
FIG. 12 is a cross sectional view illustrating an example of a structure of a 2D/3D switching type liquid crystal display panel, according to another embodiment different from the one shown in FIG. 2.
Figure 14:
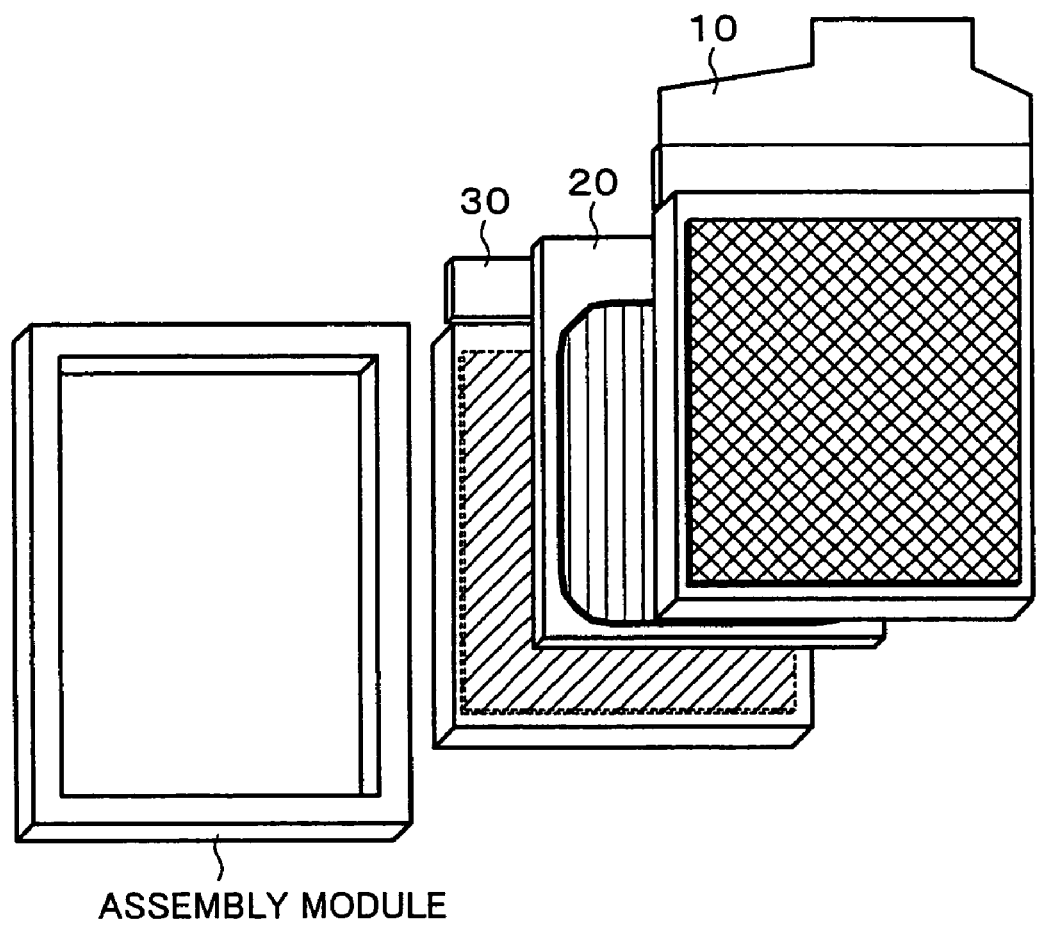
FIG. 14 is a perspective exploded view illustrating a structure of a module set used in the drop test.

10 and FIG. 12 through FIG. 14. Firstly, schematically explained is a structure of a 2D/3D switching type liquid crystal display panel according to the present invention with reference to FIG. 2.

Figure 2:
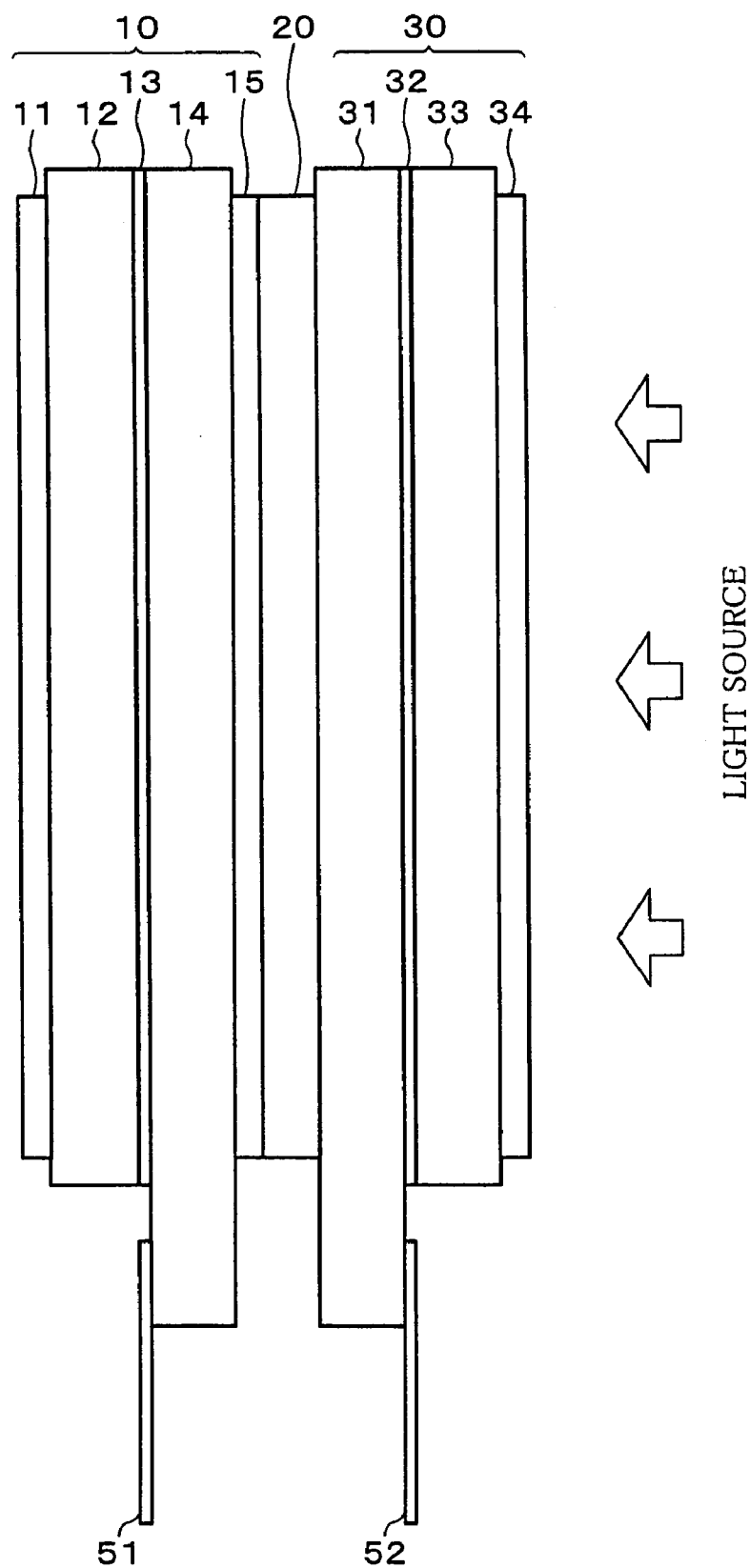
FIG. 2 is a cross sectional view illustrating an example of a structure of the 2D/3D switching type liquid crystal display panel of the present invention.

As shown in FIG. 2, the 2D/3D switching type liquid crystal display panel is constructed by assembling a display liquid crystal panel 10, a patterned retardation plate 20, and a switching liquid crystal panel 30. Further, the 2D/3D switching type liquid crystal display device is provided by providing a driving circuit and a backlight (light source) in the 2D/3D switching type liquid crystal display panel according to the present invention.

The display liquid crystal panel 10 is provided as a TFT liquid crystal display panel, and includes stacked layers of a first polarizer 11, an opposing substrate (substrate) 12, a liquid crystal layer (display liquid crystal layer) 13, an active matrix substrate (substrate) 14, and a second polarizer 15. The active matrix substrate 14 receives image data, which corresponds to an image to be displayed, via a wire 51 such as FPC (Flexible Printed Circuits) or the like.

In other words, the display liquid crystal panel 10 is provided as display image generating means for generating the display image, which correspond to the image data, on the 2D/3D switching type liquid crystal display panel. Note that a display mode (TN mode or STN mode) and a driving mode (active matrix driving or passive matrix driving) in the display liquid crystal panel 10 are not particularly limited as long as the display liquid crystal panel 10 has the function for generating the display image.

Figure 3A:
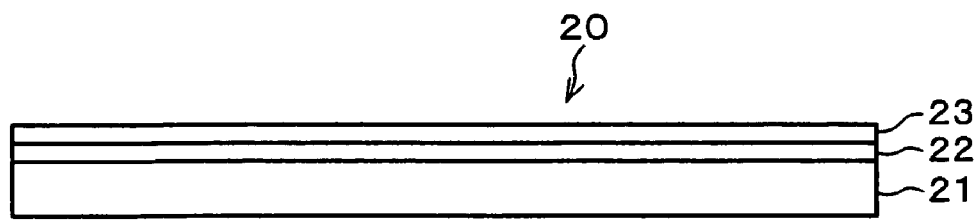
FIG. 3(a) is a cross sectional view illustrating a structure of a patterned retardation plate used in the 2D/3D switching type liquid crystal display panel.
Figure 3B:
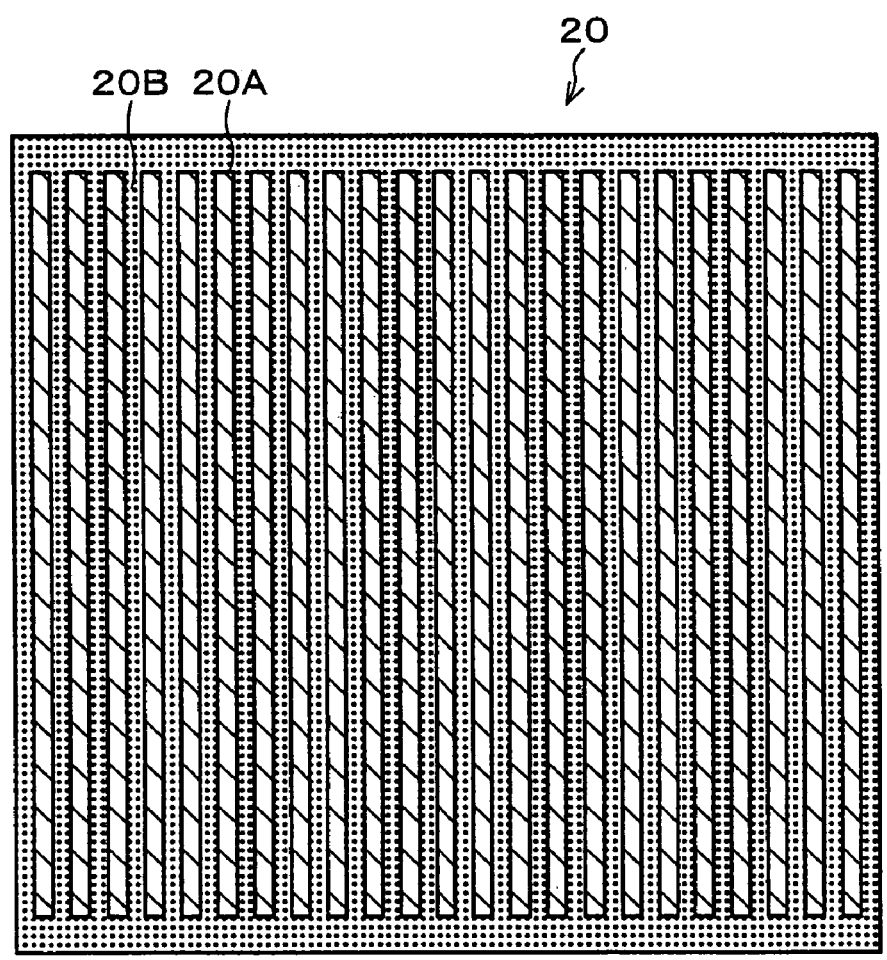
FIG. 3(b) is a plan view illustrating a structure of the patterned retardation plate used in the 2D/3D switching type liquid crystal display panel.

The patterned retardation plate 20 serves as a part of a parallax barrier, and has stacked layers of a transparent substrate 21, an alignment film 22, a liquid crystal layer 23 in this order as shown in FIG. 3(a). Further, as shown in FIG. 3(b), the patterned retardation plate 20 has an active area in which a first area 20A (indicated by an oblique line section in FIG. 3(b)) and a second area 20B (indicated by a shading section in FIG. 3(b)) are alternately patterned in a stripe manner. The first area 20A has a different polarization state from that of the second area 20B.

The switching liquid crystal panel 30 includes a driving side substrate (substrate) 31, a liquid crystal layer (switching liquid crystal layer) 32, an opposing substrate (substrate) 33, and a third polarizer 34. Further, a wire 52 is connected to the driving side substrate 31 so as to apply a driving voltage to the liquid crystal layer 32 when the liquid crystal layer 32 becomes ON.

The switching liquid crystal panel 30 serves as a switching means for switching, a polarization state of light passing through the switching liquid crystal panel 30, in response to turning ON/OFF of the liquid crystal layer 32. Specifically, the switching liquid crystal panel 30 optically modulates the light differently in 2D display or 3D display. Note that the switching liquid crystal panel 30 is not required to be matrix-driven unlike the display liquid crystal panel 10. Therefore, driving electrodes for the driving side substrate 31 and the opposing substrate 33 are formed over an entire surface of an active area of the switching liquid crystal panel 30.

The following description deals with a display operation of the 2D/3D switching type liquid crystal display panel having the structure.

Figure 4:
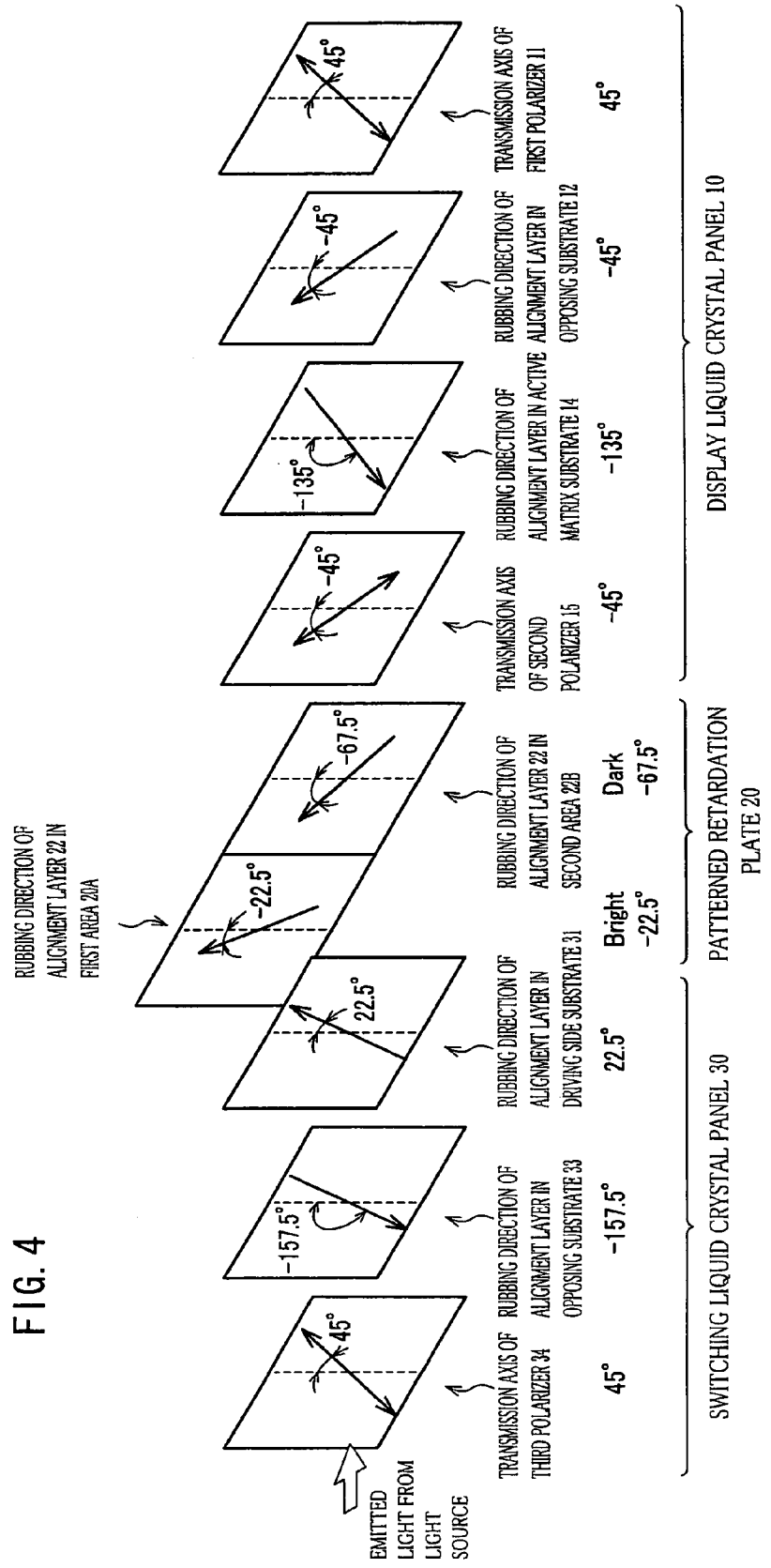
FIG. 4 illustrates directions of optic axes of constituent members of the 2D/3D switching type liquid crystal display panel.

Firstly, FIG. 4 exemplifies optic axis direction of each member of the 2D/3D switching type liquid crystal display panel shown in FIG. 2. Note that the optical axis directions of the liquid crystal panels and the retardation plate correspond to directions of retardation axes of the alignment films (rubbing directions of the alignment films), respectively. Note also that the optic axis directions of the polarizers correspond to transmission axis directions of the alignment films, respectively.

In the arrangement of FIG. 4, emitted light from the light source is firstly polarized by the third polarizer 34 of the switching liquid crystal panel 30. Note that, in 3D display, the switching panel 30 is off and serves as a ½ wavelength plate.

After passing through the switching liquid crystal panel 30, the light enters the patterned retardation plate 20, in which the first area 20A and the second area 20B have different rubbing directions, i.e., different retardation axis directions. This causes the light to be polarized differently. Specifically, the light having passed through the first area 20A has a polarization state different from the polarization state of the light having passed through the second area 20B. In the example of FIG. 4, the polarization axis of the light having passed through the first area 20A is different by a right angle from that of the light having passed through the second area 20B. With birefringence anisotropy and a film thickness of the liquid crystal layer 23, the patterned retardation plate 20 is set to serve as a ½ wavelength plate.

The light having passed through the patterned retardation plate 20 enters the second polarizer 15 of the display liquid crystal panel 10. During 3D display, the polarization axis of the light having passed through the first area 20A is parallel to the transmission axis of the second polarizer 15, and the light therefore passes through the polarizer 15. On the other hand, the polarization axis of the light having passed through the second area 20B is orthogonal to the transmission axis of the second polarizer 15, and the light therefore does not pass through the polarizer 15.

In other words, in the structure of FIG. 4, the function of parallax barrier (parallax barrier means) is attained by optical interaction between the patterned retardation plate 20 and the second polarizer (parallax barrier polarizer) 15. With this, the first area 20A of the patterned retardation plate 20 serves as a transmitting area, and the second area 20B serves as a shielding area.

The light having passed through the polarizer 15 is subjected to optical modulation in the liquid crystal layer 13 of the display liquid crystal panel 10. The optical modulation is different for the pixels undergoing black display and the pixels undergoing white display. The first polarizer 14 merely allows passing of the optically modulated light of the pixel undergoing the white display, thereby displaying an image.

Here, for 3D display, the light transmitted through the transmissive region of the parallax barrier and modified to have a specific viewing angle is transmitted through the displaying liquid crystal panel 10 in such a manner that the light passes through pixels corresponding to an image for the right eye and pixels corresponding to an image for the left eye. As a result, the right eye image and left eye image are separated to have different viewing angles, and 3D display is carried out.

In contrast, in cases where the 2D display is carried out, the switching liquid crystal panel 30 is turned ON, and the light passing through the switching liquid crystal panel 30 will not be optically modulated. Next, the light having passed through the switching liquid crystal panel 30 passes through the patterned retardation plate 20 in such a manner that the light transmitted through the first area 20A and the light transmitted through the second region 20B have different polarization states.

However, unlike 3D display, the switching liquid crystal display panel 30 does not perform optical modulation in 2D display. Therefore, the polarizing axes of the light beams transmitted through the patterned retardation plate 20 will be symmetrically with respect to the transmission axis of the second polarizer 15. As a result, the light having passed through the first area 20A and the light having passed through second area 20B pass through the second polarizer 15 at the same transmittance. Thus, the function of the parallax barrier function due to the optical interaction between the patterned retardation plate 20 and the second polarizer 15 is not attained (that is, no specific viewing angle is given) with the result that the 2D display is carried out.

Figure 5:
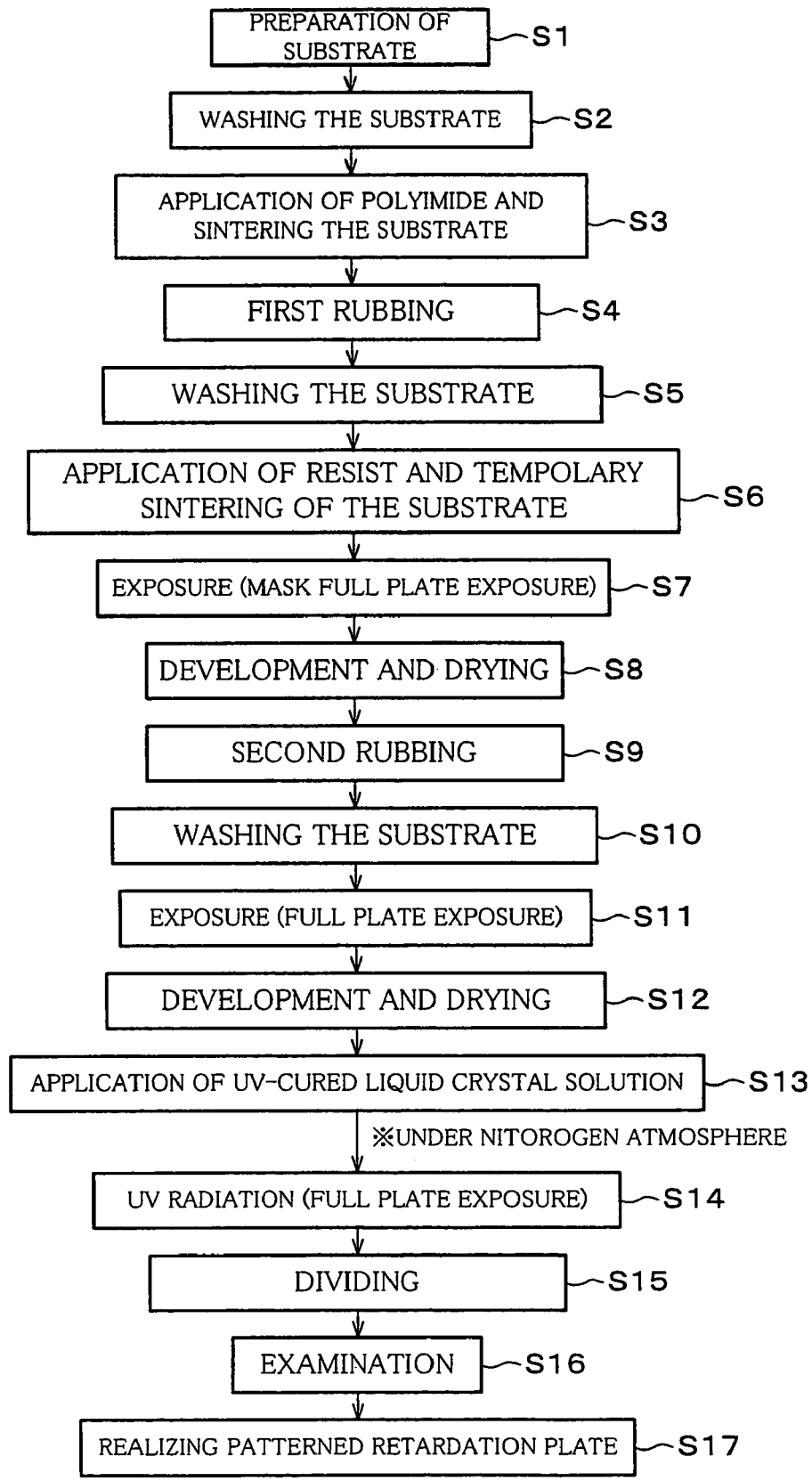
FIG. 5 is a flowchart illustrating the steps of manufacturing a patterned retardation plate used for the 2D/3D switching type liquid crystal display panel.
Figure 6:
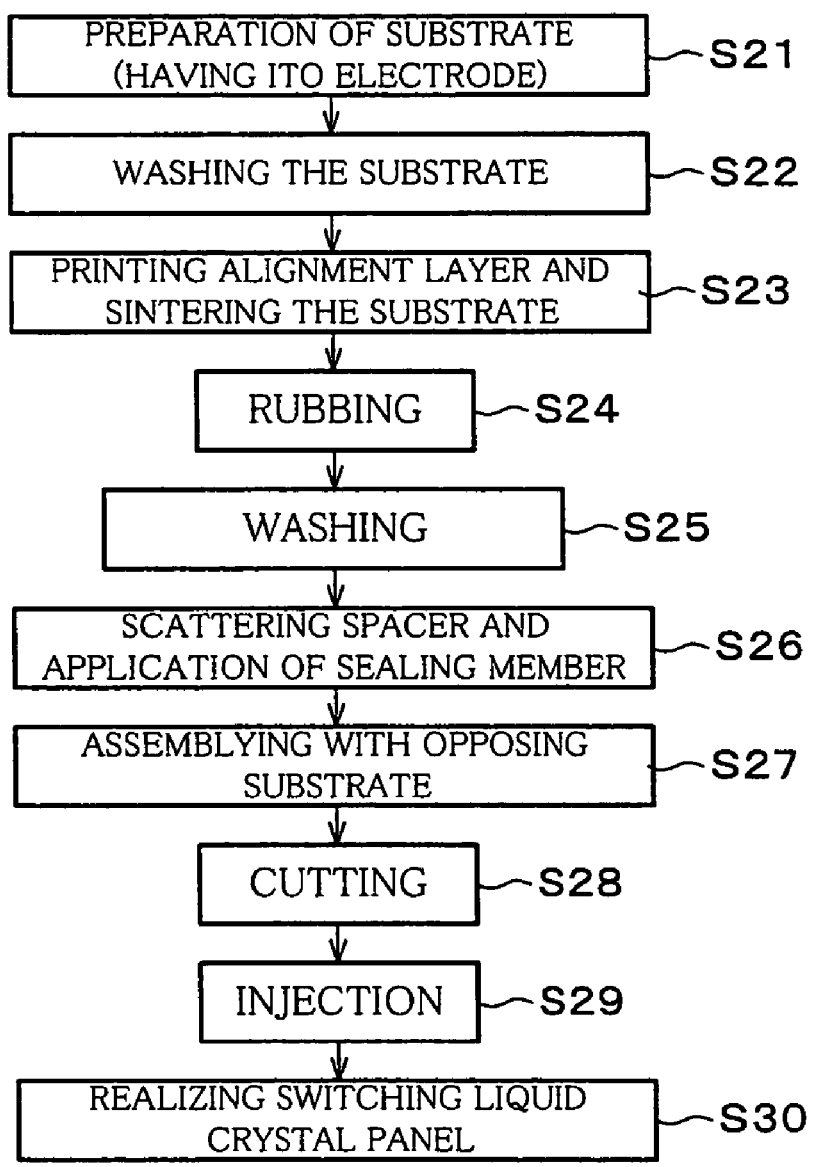
FIG. 6 is a flowchart illustrating the steps of manufacturing a switching liquid crystal panel used for the 2D/3D switching type liquid crystal display panel.
Figure 7:
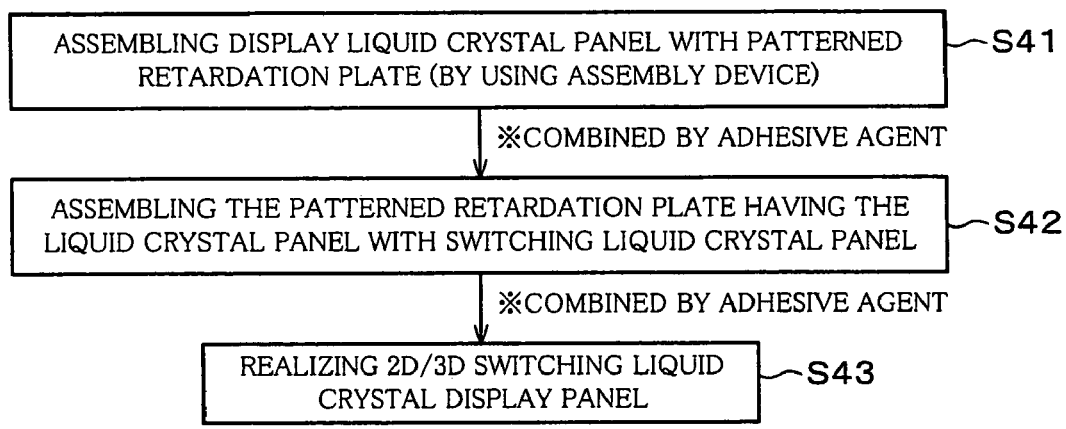
FIG. 7 is a flowchart illustrating the steps of assembling the 2D/3D switching type liquid crystal display panel.

Next, the following description deals with the steps of manufacturing the 2D/3D switching type liquid crystal panel with reference to FIG. 5 through FIG. 7. FIG. 5 is a flowchart illustrating the steps of manufacturing the patterned retardation plate 20. FIG. 6 is a flowchart illustrating the steps of manufacturing the switching liquid crystal panel 30. FIG. 7 is a flowchart illustrating the steps of assembling the 2D/3D switching type liquid crystal display panel. Note that, the manufacturing steps for the display liquid crystal panel 10 is the same as that for a conventional active matrix substrate, so that explanation thereof is omitted here.

Referring to FIG. 5, firstly in the step of manufacturing the patterned retardation plate 20, a prime glass to be the substrate 21 is washed, and polyimide is applied to a surface of the substrate, and the substrate is sintered, thereby forming the alignment film 22 (S1 through S3). Next, the alignment film 22 is subjected to a first rubbing treatment (first rubbing) (S4). Note that a rubbing direction in the first rubbing corresponds to the rubbing direction of the second area 20B (S4).

After the first rubbing, the substrate is washed, and a resist is applied to the alignment film 22, and the substrate is temporarily sintered, and then steps of exposing, developing, and drying the substrate are carried out so as to pattern the resist (S5 to S8). The patterned resist is so formed as to cover a portion that is to be the second area 20B of the patterned retardation plate 20.

Then, a second rubbing treatment (second rubbing) is carried out with respect to the surface having the patterned resist (S9). Note that a rubbing direction of the second rubbing corresponds to the rubbing direction of the first area 20A. Here, the area covered with the resist formed on the alignment film 22 keeps the retardation axis direction set by the first rubbing.

After the second rubbing, the substrate is washed, and then, exposure (full plate exposure) and development are carried out again with respect to the resist remaining on the alignment film 22 in order to remove the resist, and then the substrate is dried (S10 through S12). Next, a UV-curable liquid crystal solution is applied to the alignment film 22 by using a spin-coating method or the like, and then ultraviolet light is irradiated to the UV-curable liquid crystal solution so as to crosslink and polymerize the liquid crystal molecules (S13 through S14). In this way, the liquid crystal layer 23 is formed.

The processes S1 through S14 are carried out in such a manner that a plurality of the patterned retardation plates 20 are manufactured at once as a large substrate. Therefore, the large substrate having the patterned retardation plates 20 is divided into individual patterned retardation plates 20, and each of the divided patterned retardation plates 20 are examined to complete the patterned retardation plate 20 (S15 through S17).

The following explains the steps of manufacturing the switching liquid crystal panel 30. Referring to FIG. 6, firstly, washing is carried out with respect to a glass that has a driving electrodes made of ITO (indium tin oxide) and that is to be the driving side substrate 31, and then an alignment film is formed, by printing and sintering, on a side which has the driving electrode (S21 through S23). Next, a rubbing process is carried out with respect to the alignment film (S24).

After the rubbing, the substrate is washed, and spacers are scattered on the alignment film of the substrate, and sealing is carried out thereto, then the substrate is assembled with the opposing substrate 33 (S25 to S27). Note that the opposing substrate 33 assembled in S27 has the same structure as a conventional active matrix panel, so that detailed explanation of its manufacturing steps is omitted here.

The processes of S21 through S27 are carried out in such a manner that a plurality of cells of the switching panel 30 are manufactured at once. The switching panel 30 thus manufactured are divided into individual cells, and liquid crystal is injected into each cell, thereby completing the switching liquid crystal panel 30 (S28 through S30). Further, the third polarizer 34 is provided only on one surface of the switching liquid crystal panel 30 used in the present embodiment.

Next, the display liquid crystal panel 10, the patterned retardation plate 20, and the switching panel 30 thus manufactured are assembled together so as to construct the 2D/3D switching type liquid crystal panel of the present embodiment.

As shown in FIG. 7, in the assembling steps for constructing the 2D/3D switching type liquid crystal display panel, the patterned retardation plate 20 is assembled with the display liquid crystal panel 10 by using an adhesive agent (S41).

Further, the switching panel 30 is assembled with the display liquid crystal panel 10 having been assembled with the patterned retardation plate 20, thereby completing the 2D/3D switching liquid crystal display panel (S42 through S43).

Figure 8:
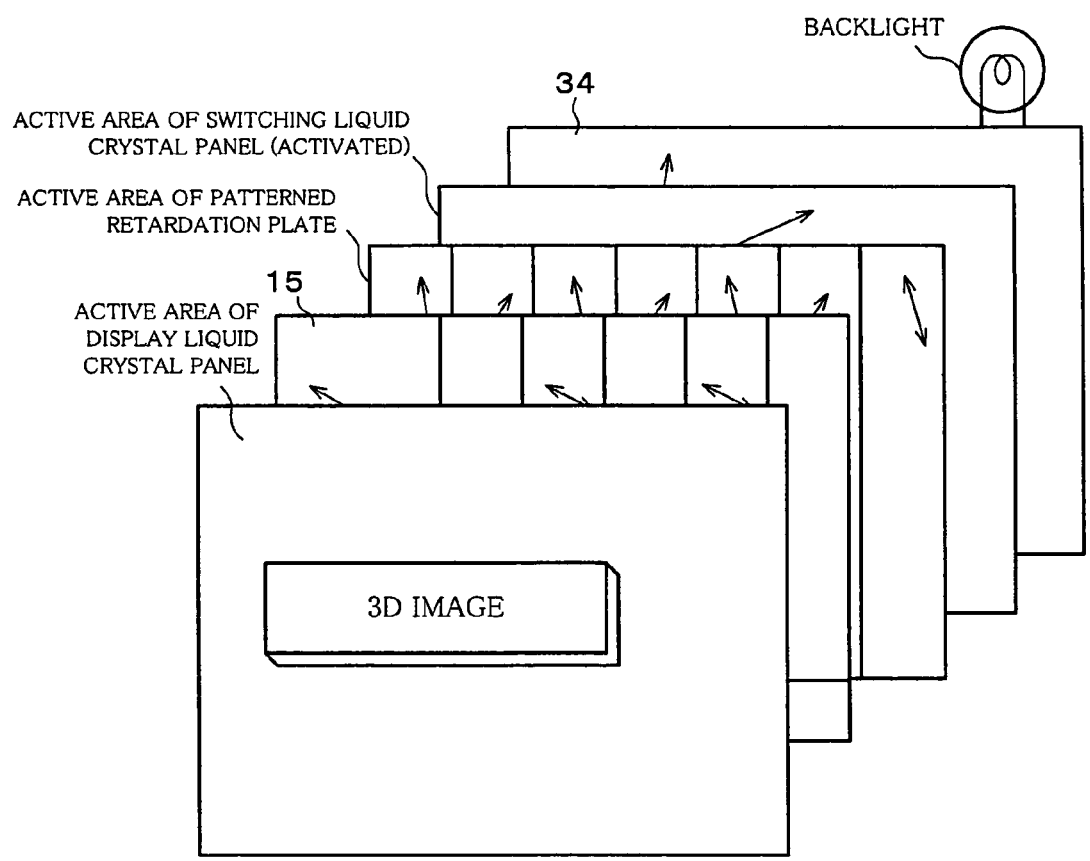
FIG. 8 illustrates an operation principle of the 2D/3D switching type liquid crystal display panel in 3D display.

FIG. 8 illustrates a principle of 3D display operation of the 2D/3D switching type liquid crystal display panel. Specifically, emitted light from the backlight (light source) is polarized by the third polarizer 34, and is subjected to optical modulation in the active area of the switching liquid crystal panel 30. By the optical modulation, the effect of the parallax barrier is activated.

The light having passed through the active area of the switching liquid crystal panel is affected by the parallax barrier as it passes through the patterned retardation plate 20 and the second polarizer 15. As a result, the images (the right-eye image and the left-eye image) displayed in the active area of the display liquid crystal panel 10 are rendered specific viewing angles.

Figure 9:
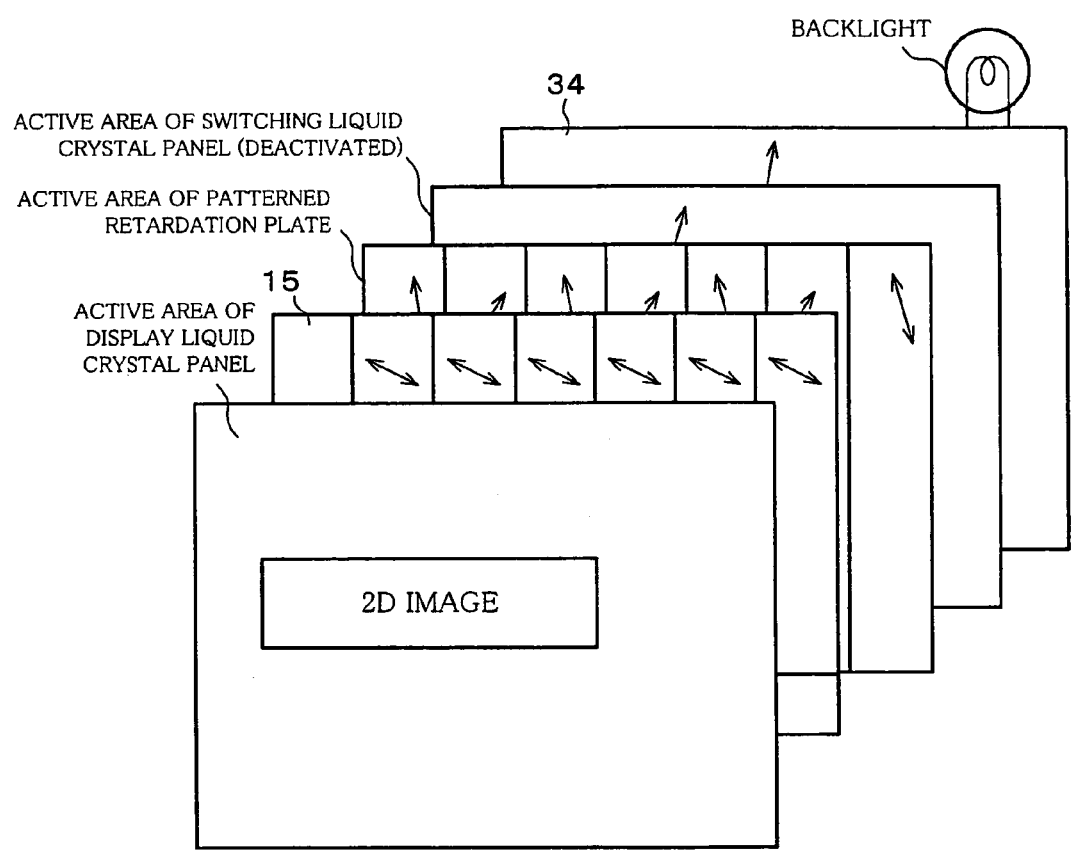
FIG. 9 illustrates an operation principle of the 2D/3D switching type liquid crystal display panel in 2D display.

In contrast, FIG. 9 illustrates a principle of 2D display operation. In this case, the emitted light from the backlight (light source) is polarized by the third polarizer 34, but is not subjected to optical modulation when passing through the active area of the switching liquid crystal panel 30. Namely, the effect of the parallax barrier is deactivated by the switching liquid crystal panel 30.

When the light having passed through the switching liquid crystal panel 30 passes through the patterned retardation plate 20 and the second polarizer 15, the light is not affected by the parallax barrier therein. This causes a 2D image to be displayed in the active area of the display liquid crystal panel 10.

As described above, in the 2D/3D switching type liquid crystal display panel, the emitted light from the backlight is used for display by passing through the respective active areas of the display liquid crystal panel 10, the patterned retardation plate 20, and the switching liquid crystal panel 10, regardless of the 2D display or 3D display.

Note that the active area of the display liquid crystal panel 10 refers to the area in which pixels are provided in a matrix manner and in which a display image is generated. The active area of the patterned retardation plate 20 refers to the area in which the first and the second areas are formed in a stripe manner. The active area of the switching liquid crystal panel 30 refers to the area in which the light passing through the switching liquid crystal panel 30 can be subjected to optical modulation according to an applied voltage to the liquid crystal layer 32.

Figure 10:
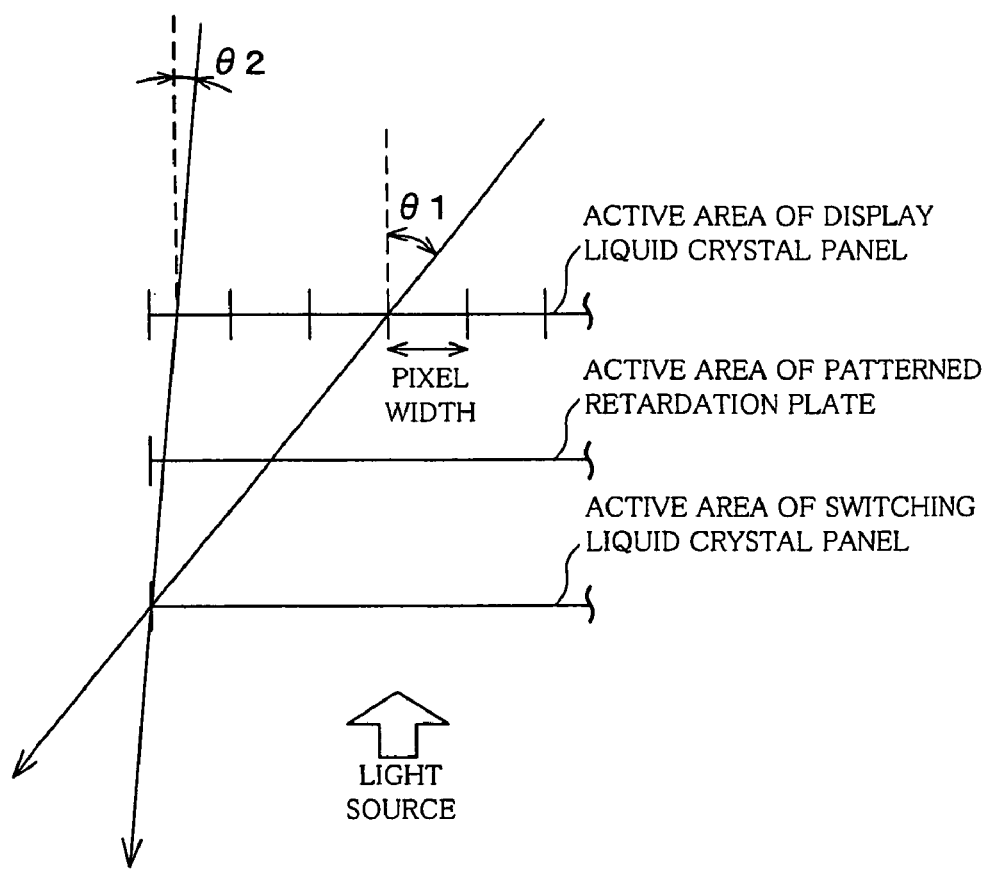
FIG. 10 illustrates a relation between a viewing angle and visibility when the respective active areas in the 2D/3D switching type liquid crystal display panel have the same width.
Figure 11A:
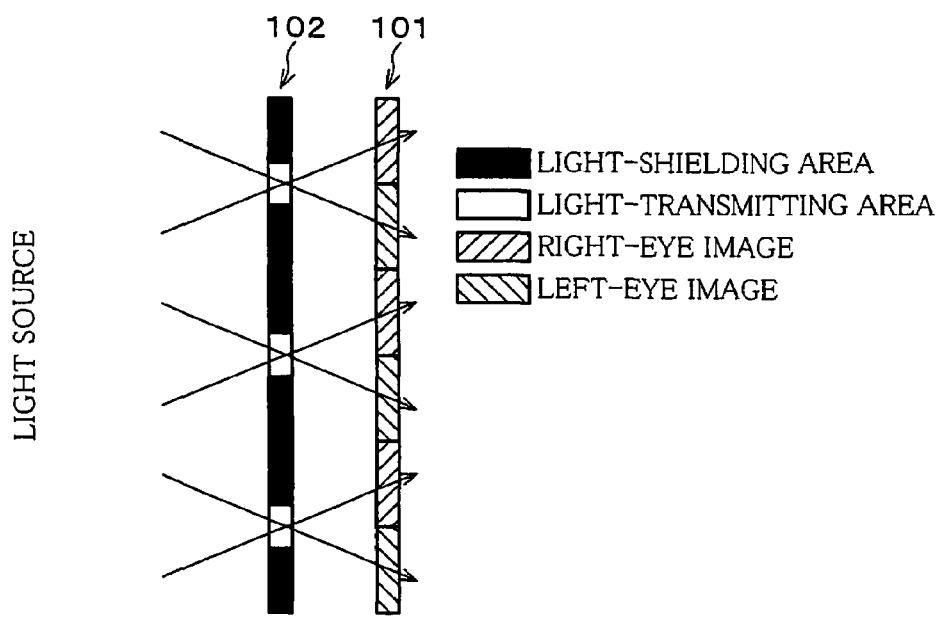
FIG. 11(a) illustrates a 3D display principle, and an effect of rendering a viewing angle by the parallax barrier.
Figure 11B:
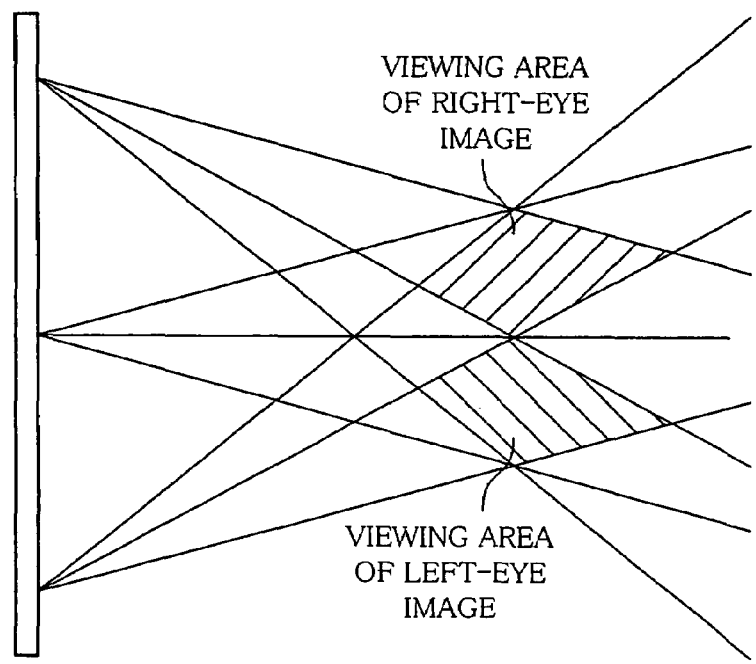
FIG. 11(b) illustrates a 3D display principle, and viewing areas in 3D display.

Here, assuming that the active areas have the same width, the light that has passed through the active area of the display liquid crystal display panel 10 in the vicinity of an edge of the display screen is shielded by an area outside the active area of the patterned retardation plate 20 or the switching liquid crystal panel 30, when the light is incident obliquely with respect to the display screen of the 2D/3D switching type liquid crystal display panel, as shown in FIG. 10. This causes no problem in 3D display, which intends to provide a view square to the screen, but causes a problem of narrowing the viewing angle in 2D display, which should allow for oblique viewing with respect to the screen.

In the example of FIG. 10, θ1 is a viewing angle secured by the display liquid crystal panel 10 (a permissible viewing angle of 2D-only display using only the display liquid crystal panel 10). When viewed at θ1, an image that corresponds to about three pixels at an end portion of the screen is lost and becomes unseeable. A viewing angle that provides a view of a full image is extremely narrower than that of the 2D-only display, as indicated by θ2.

A feature of the 2D/3D switching type liquid crystal display panel of the present invention lies in a structure for realizing, in 2D display, a viewing angle as wide as that of the 2D-only display. Specifically, the 2D/3D switching type liquid crystal display panel is so arranged that each active area of the patterned retardation plate 20 and the switching liquid crystal panel 30 has an end portion extending beyond the end portion of the active area of the display liquid crystal panel 10.

With this, the patterned retardation plate 20 and the switching liquid crystal panel 30 have wider active areas than the display liquid crystal panel 10 does. This restrains the shielding-off of the light in the area outside the active area of the patterned retardation plate 20 or the switching liquid crystal panel 30 when the light passes through the active area of the display liquid crystal panel 10 in the vicinity of an end portion of the screen. Accordingly, the viewing angle in 2D display is improved.

Here, assume d1 is a protrusion amount of the end portion of the active area of the display liquid crystal panel 10 with respect to the end portion of the active area of the patterned retardation plate 20. Also, d2 is a protrusion amount of the end portion of the active area of the display liquid crystal panel 10 with respect to the end portion of the active area of the switching liquid crystal panel 30. Further, t1 is a distance between (i) the active area of the display liquid crystal panel 10, and (ii) the active area of the patterned retardation plate 20. Also, t2 is a distance between (i) the active area of the display liquid crystal panel 10, and (ii) the active area of the switching liquid crystal panel 30. Further, θ1 is the viewing angle secured by the display liquid crystal panel 10.

Figure 1A:
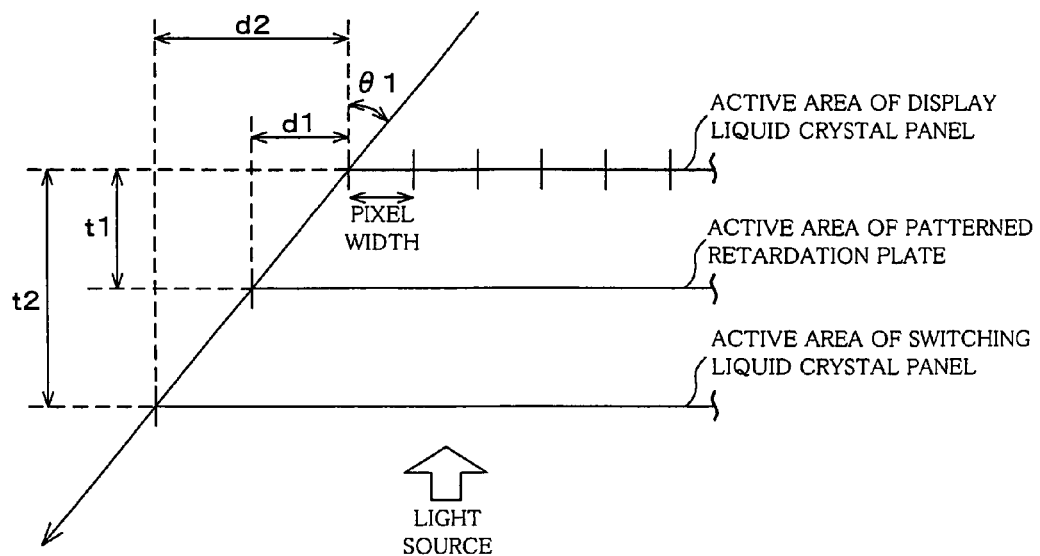
FIG. 1(a) illustrates a relation in size between active areas in the case where an active area of a display liquid crystal panel is positioned on a front side, according to one embodiment of the present invention.

Referring to FIG. 1(a), in order to provide a view of the full image without the missing end portion at the viewing angle θ1, the 2D/3D switching type liquid crystal display panel according to the present embodiment is so set as to satisfy:

$$d1 \geq t1 \cdot \tan \theta1, \text{ and } d2 \geq t2 \cdot \tan \theta1 \tag{1}$$

In this case, light entering at the viewing angle θ1 and passing through the end portion of the active area of the display liquid crystal panel 10 passes through the active areas of the patterned retardation plate 20 and the switching liquid crystal panel 30. This allows a displayed image to be viewed without a missing end portion, even when viewed at a viewing angle as wide as that of the 2D-only display.

Note that FIG. 1(a) exemplifies such a structure that the active area of the display liquid crystal panel 10 is provided on a front side (display surface side) and that the active areas of the patterned retardation plate 20 and the switching liquid crystal panel 30 are provided on a rear side (light source side).

Figure 1B:
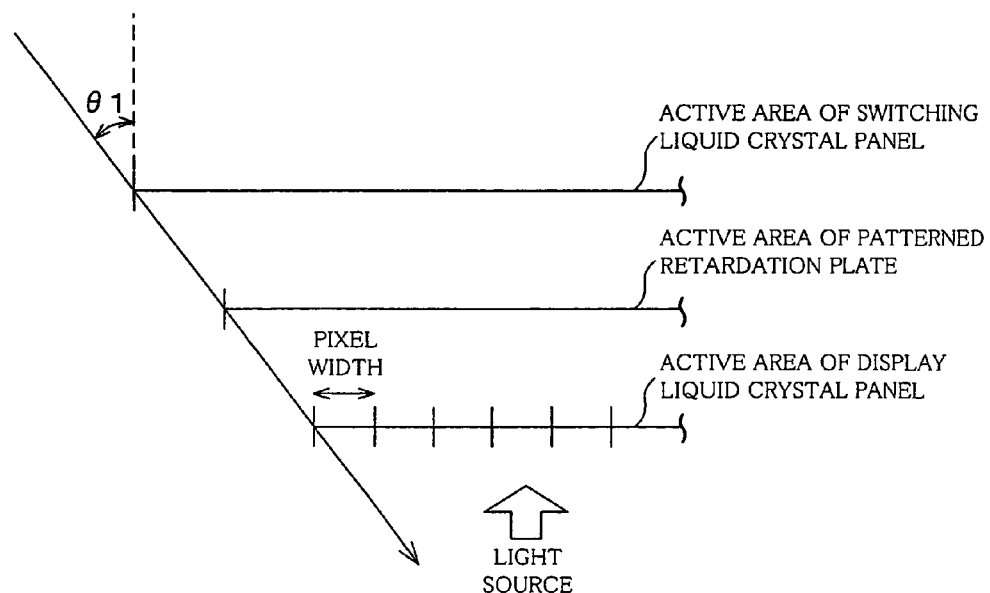
FIG. 1(b) illustrates a relation in size between active areas in the case where the active area of the display liquid crystal panel is positioned on a rear side.

However, this example is not the only structure of the 2D/3D switching type liquid crystal display panel of the present invention. The 2D/3D switching type liquid crystal display panel may be so arranged that the active area of the display liquid crystal panel 10 is provided on the rear side (light source side) as shown in FIG. 1(b). In this case, either the patterned retardation plate 20 or the switching liquid crystal panel 30 may be provided closer to the light source; however, it is preferable to provide the display liquid crystal panel 10, the patterned retardation plate 20, and the switching liquid crystal panel 30 in this order from the light source. A reason for this is that: the closer the distance between the display liquid crystal panel 10 and the patterned retardation plate 20 is, the easier it is to obtain the effect of 3D display.

However, the polarizer serving as a part of the parallax barrier is required to be provided closer to the display surface than the patterned retardation plate 20 and the switching liquid crystal panel 30. Specifically, the polarizer is so provided on the switching liquid crystal panel 30 as to be closer to the display surface rather than the light source. With this, the polarizer constitutes a part of the parallax barrier.

Further, it is preferable that whichever one of the active areas of the patterned retardation plate 20 and the switching liquid crystal panel 30 farther away from the active area of the display liquid crystal panel 10 be wider. That is, it is preferable that the examples shown in FIG. 1(a) and FIG. 1(b) both satisfy the following inequality: D1<D2<D3, where D1 is the width of the active area of the display liquid crystal panel 10, D2 is the width of the active area of the patterned retardation plate 20, and D3 is the width of the active area of the switching liquid crystal panel 30.

Also in the example shown in FIG. 1(b), an image without a missing end portion can be viewed at the viewing angle θ1 as long as the active areas of the display liquid crystal panel 10, the patterned retardation plate 20, and the switching liquid crystal panel 30 satisfy the aforesaid inequalities (1).

Note that the structures shown in FIG. 1 and FIG. 2 are effective not only in a horizontal direction with respect to the display screen but also in a perpendicular direction with respect to the display screen.

The 2D/3D switching type liquid crystal display panel of the present embodiment is constituted by combining the display liquid crystal panel 10, the patterned retardation plate 20, and the switching liquid crystal panel 30. The substrate 21 of the patterned retardation plate 20 does not require essentially any area other than the active area for the sake of display operation.

On the contrary, the substrate (particularly the active matrix substrate 14) of the display liquid crystal panel 10, and the substrate (particularly the driving side substrate 31) of the switching liquid crystal panel 30 respectively require terminal sections for receiving electric signals in order to control voltage application to the liquid crystal layers in the active areas. Accordingly, the substrates of the display liquid crystal panel 10 and the switching liquid crystal panel 30 require areas (terminal formation portions) for the terminal sections, respectively.

In the structure shown in FIG. 2, there is provided a terminal formation portion 14a in the active matrix substrate 14 of the display liquid crystal panel 10, and there is provided a terminal formation portion 31a in the driving side substrate 31 of the switching liquid crystal panel 30.

Here, if the displaying liquid crystal panel 10, the patterned retardation plate 20, and the switching liquid crystal panel 30 have minimum required substrate areas, the terminal formation portions of the displaying liquid crystal panel 10 and the switching liquid crystal panel 30 protrude when the substrates are assembled. Therefore, the substrates having the protruding terminal formation portions tend to easily crack due to a shock or the like, as descried in the BACKGROUND ART section.

For this reason, in the 2D/3D switching type liquid crystal display panel according to the present embodiment, the terminal formation portions 14a and 31a are positioned on the same side of the 2D/3D switching type liquid crystal display panel as shown in FIG. 2.

With this, the terminal formation portions 14a and 31a overlap with each other when viewed from the display screen side. This improves strength against stress exerted on the display screen, and makes it difficult to cause a crack in the substrates having the terminal formation portions 14a and 31a.

Further, in the 2D/3D switching type liquid crystal display panel, the larger substrates of the display liquid crystal panel 10 and the switching liquid crystal panel 30, respectively, are so assembled as to be inner substrates. The larger substrates refer to the substrates having the terminal formation portions 14a and 31a, respectively. In other words, the display liquid crystal panel 10, the retardation plate 20, and the switching liquid crystal panel 30 are assembled in the following manner. That is, the display liquid crystal panel 10 and the switching liquid crystal panel 30 are provided face to face so that the active matrix substrate 14 of the display liquid crystal panel 10 and the driving side substrate 31 of the switching liquid crystal panel 30 face each other. The active matrix 14 is one of the two glass substrates of the display liquid crystal panel 10, and has the terminal formation portion 14a. The driving side substrate 31 is one of the two glass substrates of the switching liquid crystal panel, and has the terminal formation portion 31a.

This shortens the distance between the respective substrates having the terminal formation portions 14a and 31a. With this, the display liquid crystal panel 10 and the switching liquid crystal panel 30 can protect their electronic components each other. This makes it difficult to cause a crack in the substrates having the terminal formation portion 14a and 31a.

Note that the aforementioned 2D/3D switching liquid crystal panel is constructed by assembling the three members; (i) the display liquid crystal panel 10, (ii) the patterned retardation panel 20, and (iii) the switching liquid crystal panel 30, all of which are separately made. However, the 2D/3D switching type liquid crystal display panel of the present invention may be constructed by assembling two members.

For example, as shown in FIG. 12, the 2D/3D switching type liquid crystal display panel may be constructed from the display liquid crystal panel 10 and a switching liquid crystal panel 40. The switching liquid crystal panel 40 is fabricated by forming a patterned retardation layer 41 on a surface of the switching liquid crystal panel 30 to be mated with the displaying liquid crystal panel 10 (see FIG. 2). With the patterned retardation layer 41 formed on the driving-side substrate 31, the transparent substrate 21 of the patterned retardation plate 20 is omitted.

The switching liquid crystal panel 40 is fabricated in accordance with the steps of the flowchart shown in FIG. 6 by using, as one substrate, the patterned retardation plate fabricated in accordance with the steps of the flowchart shown in FIG. 5.

It should be noted that the patterned retardation layer 41 of the switching liquid crystal panel 40 is not necessarily limited to a liquid crystal layer, but can be, e.g., a patterned resin. Note also that the position of the patterned retardation layer 41 is not limited to the surface to be mated with the displaying liquid crystal panel 10.

Further, apart from using the patterned retardation layer 41, there is alternative means for attaining the aforementioned parallax barrier function in the switching liquid crystal panel 40. For example, rib members are so arranged in a lath-shaped manner as to be pillars, and liquid crystal is injected between the pillars. By controlling optical rotation and birefringence of the liquid crystal, two types of light are obtained: (1) light passing through the ribs to be viewed, and (2) light passing through the liquid crystal to be viewed.

Further, also in the 2D/3D switching type liquid crystal display panel having the structure shown in FIG. 12, the relation shown in FIG. 1(a) or FIG. 1(b) is satisfied by (i) the active area of the liquid crystal layer 13 of the display liquid crystal panel 10 and (ii) the active areas of the patterned retardation layer 41 and the liquid crystal layer 32 of the switching liquid crystal panel 40.

Further, the 2D/3D switching type liquid crystal display panel explained above assumes that the terminal formation portion is formed on only one of the two substrates of each of the display liquid crystal panel 10 and the switching liquid crystal panel 30 (or switching liquid crystal panel 40).

However, depending on use of the 2D/3D switching type liquid crystal display panel, the terminal formation portion may be positioned, for example, (i) on two sides of the display liquid crystal panel 10, and (ii) on a side of each of the substrates of the display liquid crystal panel 10. In such a case, it is preferable that the substrate opposing the switching liquid crystal panel 30 have a larger area (have a larger terminal formation portion).

Because the larger substrate (the substrate having the larger terminal formation portion) is positioned on the inner side of the stacked 2D/3D switching liquid crystal display panel, a more margin against cracking is provided. The improved sturdiness of the substrate having the terminal formation portion allows for protection of electric components of circuits provided on the periphery (corresponding to the terminal formation portion) of the substrate.

In order to examine the crack prevention effect of the 2D/3D switching type liquid crystal display panel according to the present invention, a drop test was carried out by using a plurality of samples: a sample A (see FIG. 13(a)), and a sample B (see FIG. 13(b)). Note that the liquid crystal layers are omitted in FIGS. 13(a) and 13(b).

Sample A was prepared as a reference example with respect to the present invention, and had such a structure that the driving side substrate 31 was provided on the opposite side of the switching liquid crystal panel 30 from the mated surface (the larger substrates having terminal formation portions 14*a* and 31*a* were not provided on the inner side). Specifically, there were two glass substrates between the active matrix substrate 14 having the terminal formation portion 14*a* and the driving side substrate 31 having the terminal section 31*a*; namely, (1) the transparent substrate 21 of the patterned retardation plate 20, and (2) the opposing substrate 33 of the switching liquid crystal panel 30. The active matrix substrate 14 was provided in the display liquid crystal panel 10, and the driving matrix substrate 31 was provided in the switching liquid crystal panel 30.

On the other hand, sample B corresponds to the present invention, and had such a structure that the active matrix substrate 14 having the terminal formation portion 14*a* and the driving side substrate 31 having the terminal formation portion 31*a* were both assembled as the inner substrates. Therefore, in sample B, the transparent substrate 21 of the patterned retardation plate 20 was the only glass substrate provided between the substrates, and the distance therebetween was therefore shorter than that of sample A.

The drop test for samples A and B was carried out as follows. That is, the display liquid crystal panel 10, the patterned retardation plate 20, and the switching liquid crystal panel 30 are incorporated in a modular set shown in FIG. 14, and each module was dropped with the display screen upward. A result of the drop test is shown in Table 1 below.

TABLE 1

| Sample | Height (cm) | | | | | | | |
|---|---|---|---|---|---|---|---|---|
| | 30 | 40 | 50 | 60 | 70 | 80 | 90 | 100 |
| Sample A | No crack | Crack | Crack | Crack | Crack | Crack | Crack | Crack |
| Sample B | No crack | No crack | No crack | No crack | No crack | No crack | No crack | Crack |

Note that the substrates tested for the presence or absence of a crack are made of glass; however, a crack also generates even when the substrates of the 2D/3D switching type liquid crystal display panel are made of plastic. Therefore, the material of the substrates is not particularly limited in the 2D/3D switching type liquid crystal display panel.

According to the result shown in Table 1, sample A of the reference example cracked when dropped from a height of 40 cm. On the contrary, sample B according to the present invention did not crack until it was dropped from a height of 90 cm. This indicates that sample B is at least twice as reliable as sample A. This confirmed that the 2D/3D switching type liquid crystal display panel of the present invention had the substrate crack prevention effect.

Note that the terminal formation portion had a protruding amount of 4.5 mm, and the distance between the two glass substrates having the terminal formation portions was 0.3 mm in sample B, which corresponds to the present invention and in which the substrate crack prevention effect was obtained in the test.

In order to obtain the substrate crack prevention effect of the present invention, it is preferable that, when the thickness of each glass substrate is approximately 0.4 mm, the protruding amount of each terminal formation portion is 1 mm through 5 mm, and the distance between the two glass substrates each having the terminal formation portions is 0.25 mm through 0.35 mm.

The embodiments and concrete examples of implementation discussed in the foregoing detailed explanation serve solely to illustrate the technical details of the present invention, which should not be narrowly interpreted within the limits of such embodiments and concrete examples, but rather may be applied in many variations within the spirit of the present invention, provided such variations do not exceed the scope of the patent claims set forth below.

INDUSTRIAL APPLICABILITY

According to the structure of the present invention, it is possible to provide a (2D/3D switching) liquid crystal panel and a (2D/3D switching) liquid crystal device, each of which switches a first display (2D display) and a second display (3D display), and which allows a viewing angle during the first display is as wide as a viewing angle of one carrying out only the first display (2D-only display). Further, reliability against dropping and a shock is improved in the (2D/3D switching) liquid crystal panel and liquid crystal device which switches the first display and the second display. This enables the liquid crystal panel and the liquid crystal display device to be suitably used.

The invention claimed is:

1. A 2D/3D switching type liquid crystal display panel capable of 2D display and 3D display, comprising: display image generating means for generating an image in accordance with input image data; parallax barrier means for rendering a certain viewing angle to a display image during 3D display, so as to provide a 3D effect; and switching means for switching 2D display and 3D display by activating and deactivating the effect of the parallax barrier means,
   the parallax barrier means and the switching means respectively having wider active areas than an active area of the display image generating means.

2. The 2D/3D switching type liquid crystal display panel as set forth in claim 1, wherein:
   one of the active areas of the parallax barrier means and the switching means farther away from the active area of the display image generating means has a wider area.

3. The 2D/3D switching type liquid crystal display panel as set forth in claim 1, wherein:

$d1 \geq t1 \cdot \tan \theta 1$, and $d2 \geq t2 \cdot \tan \theta 1$ are satisfied, where d1 is a widthwise protruding amount from an end portion of the active area of the display image generating means to an end portion of the active area of the parallax barrier means and, d2 is a widthwise protrusion amount from the end portion of the active area of the display image generating means to an end portion of the active area of the switching means, t1 is a distance, in a panel thickness direction, between the active area of the parallax barrier means and the active area of the display image generating means, and t2 is a distance, in the panel thickness direction, between the active area of the switching means and the active area of the display image generating means, and θ1 is a viewing angle secured by the display image generating means the 2D/3D switching type liquid crystal.

4. The 2D/3D switching type liquid crystal display panel as set forth in claim 1, wherein:
   the parallax barrier means is constituted of (i) a patterned retardation plate in which two optical regions with different retardation axis directions are patterned alternately in a stripe manner, and (ii) a parallax barrier polarizer whose transmission axis is fixed in one direction, and
   the display image generating means, the patterned retardation plate, and the switching means are disposed in this order.

5. The 2D/3D switching type liquid crystal display panel as set forth in claim 1, wherein:
the parallax barrier means is constituted of (i) a patterned retardation plate in which two optical regions with different retardation axis directions are patterned alternately in a stripe manner, and (ii) a parallax barrier polarizer whose transmission axis is fixed in one direction,
the switching means is constituted of a liquid crystal panel for switching, between ON and OFF of an applied voltage, an optical modulation effect on light passing through the switching means, and
in 2D display, the light passing the switching means is affected by two optical areas of the patterned retardation plate to pass through the parallax barrier polarizer at the same transmittance, and in 3D display, the light passing the switching means is affected by the optical areas of the patterned retardation plate to pass through the parallax barrier polarizer at the different transmittances.

6. The 2D/3D switching type liquid crystal display panel as set forth in claim 1, wherein:
the display image generating means is provided as a display liquid crystal panel that has two substrates between which a display liquid crystal layer is sandwiched, and that is able to generate a display image for each of 2D display and 3D display,
the parallax barrier means is provided as a patterned retardation plate that is obtained by providing, on a substrate, a patterned liquid crystal layer aligned in a specific pattern, and that renders a certain viewing angle to an image for 3D display,
the switching means is provided as a switching liquid crystal panel that has two substrates between which a switching liquid crystal layer is sandwiched, and that switches between 2D display and 3D display by activating and deactivating the effect of the parallax barrier of the patterned retardation plate, and
the display liquid crystal panel and the switching liquid crystal panel are provided such that a terminal formation portion of the display liquid crystal panel and a terminal formation portion of the switching liquid crystal panel are on a same side of the 2D/3D switching type liquid crystal display panel.

7. The 2D/3D switching type liquid crystal display panel as set forth in claim 6, wherein:
the terminal formation portion of the display liquid crystal panel is provided on one of two substrates of the display liquid crystal panel, and the terminal formation portion of the switching liquid crystal panel is provided on one of two substrates of the switching liquid crystal panel, and the display liquid crystal panel and the switching liquid crystal panel are disposed face to face so that the substrates respectively having the terminal formation portions face each other.

8. The 2D/3D switching type liquid crystal display panel as set forth in claim 6, wherein:
the display liquid crystal panel and the switching liquid crystal panel are disposed face to face so that a larger of the two substrates of the display panel faces a larger of the two substrates of the switching liquid crystal panel.

9. The 2D/3D switching type liquid crystal display panel as set forth in claim 1, wherein
the display image generating means is provided as a display liquid crystal panel that has two substrates between which a display liquid crystal layer is sandwiched, and that is able to generate a display image for each of 2D display and 3D display,
the parallax barrier means and the switching means are provided as a switching liquid crystal panel, the switching liquid crystal panel having two substrates between which a switching liquid crystal layer is sandwiched, and a specific pattern, and
the display liquid crystal panel and the switching liquid crystal panel are disposed such that a terminal formation portion of the display liquid crystal panel and a terminal formation portion of the switching liquid crystal panel are on a same side of the 2D/3D switching type liquid crystal display panel.

10. The 2D/3D switching type liquid crystal display panel as set forth in claim 9, wherein:
the terminal formation portion of the display liquid crystal panel is provided on one of two substrates of the display liquid crystal panel, and the terminal formation portion of the switching liquid crystal panel is provided on one of two substrates of the switching liquid crystal panel, and the display liquid crystal panel and the switching liquid crystal panel are disposed face to face so that the substrates respectively having the terminal formation portions face each other.

11. The 2D/3D switching type liquid crystal display panel as set forth in claim 9, wherein:
the display liquid crystal panel and the switching liquid crystal panel are disposed face to face so that a larger of the two substrates of the display panel faces a larger of the two substrates of the switching liquid crystal panel.

12. A 2D/3D switching type liquid crystal display device, comprising: a 2D/3D switching type liquid crystal display panel capable of 2D display and 3D display, the 2D/3D switching type liquid crystal display panel including: display image generating means for generating an image in accordance with input image data; parallax barrier means for rendering a certain viewing angle to a display image during 3D display, so as to provide a 3D effect; and switching means for switching 2D display and 3D display by activating and deactivating the effect of the parallax barrier means,
the parallax barrier means and the switching means respectively having wider active areas than an active area of the display image generating means.

13. A liquid crystal display panel, comprising: (i) display image generating means for generating two display images in accordance with input image data; (ii) parallax barrier means for separating the display images to have different viewing angles; and (iii) switching means for switching the effect of the parallax barrier means to be activated or deactivated,
the parallax barrier means and the switching means having wider active areas than an active area of the display image generating means.

14. A liquid crystal display device comprising a liquid crystal panel including: (i) display image generating means for generating two display images in accordance with input image data; (ii) parallax barrier means for separating the display images to have different viewing angles; and (iii) switching means for switching the effect of the parallax barrier means to be activated or deactivated,
the parallax barrier means and the switching means having wider active areas than an active area of the display image generating means.

* * * * *